Jan. 28, 1964   R. E. KAUFMANN   3,119,582
CONTROL APPARATUS
Filed Nov. 24, 1961   4 Sheets-Sheet 1

FIG. 1

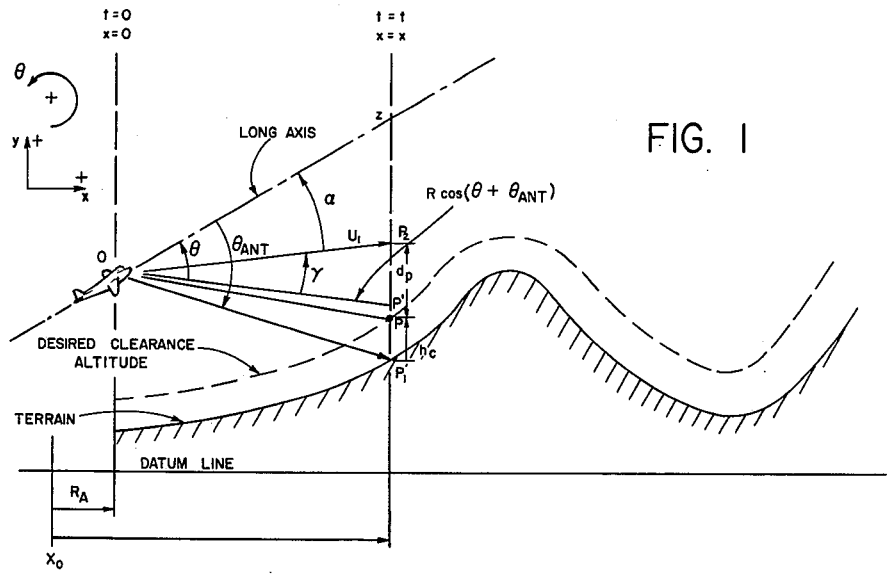

FIG. 2

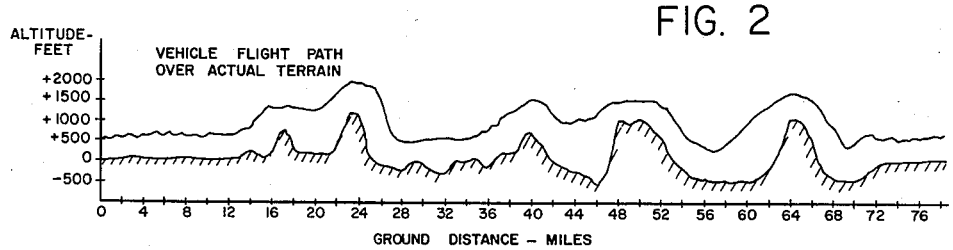

FIG. 3

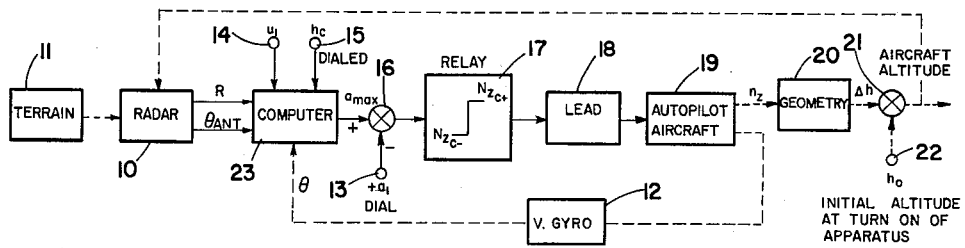

$a_{max}$ = MAXIMUM COMPUTED ACCELERATION
$N_{c_{z+}}$ = POSITIVE COMMAND LIMIT IN g's
$N_{c_{z-}}$ = NEGATIVE COMMAND LIMIT IN g's
$h_c$ = DESIRED CLEARANCE ALTITUDE
$\theta_{ANT}$ = RADAR ANTENNA ANGLE
$\theta$ = AIRCRAFT PITCH ATTITUDE R = RADAR RANGE
$a_i$ = PRESET ACCELERATION
$n_z$ = VEHICLE LOAD FACTOR
$u_i$ = VEHICLE VELOCITY
h = ALTITUDE
a = ACCELERATION

*INVENTOR.*
RAYMOND E. KAUFMANN
BY
ATTORNEY.

INVENTOR.
RAYMOND E. KAUFMANN

Jan. 28, 1964  R. E. KAUFMANN  3,119,582
CONTROL APPARATUS
Filed Nov. 24, 1961  4 Sheets-Sheet 4
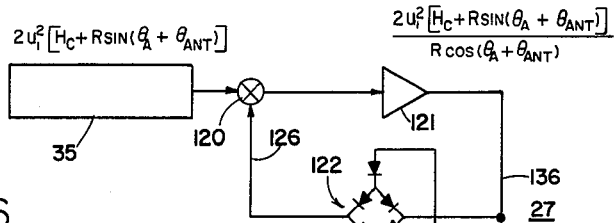
FIG. 6
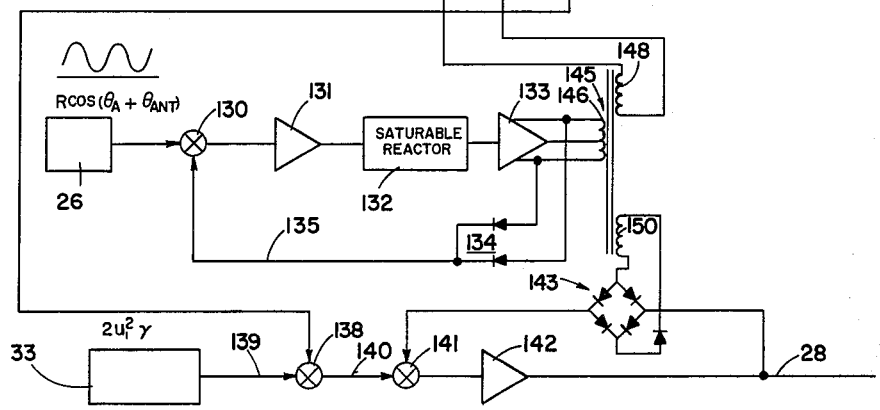
FIG. 7
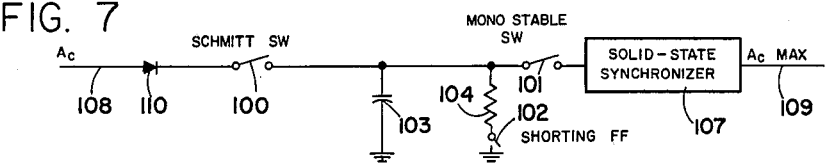
FIG. 7A
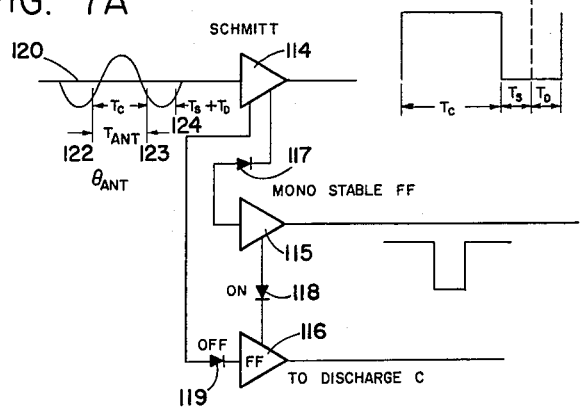
$T_C$ = CHARGING TIME
$T_S$ = SAMPLING TIME
$T_D$ = DISCHARGE TIME
FF = FLIP FLOP
INVENTOR.
RAYMOND E. KAUFMANN
BY
ATTORNEY.

United States Patent Office 3,119,582
Patented Jan. 28, 1964

3,119,582
CONTROL APPARATUS
Raymond E. Kaufmann, Golden Valley, Minn., assignor to Minneapolis-Honeywell Regulator Company, Minneapolis, Minn., a corporation of Delaware
Filed Nov. 24, 1961, Ser. No. 154,725
12 Claims. (Cl. 244—77)

The present invention relates to control apparatus in which a dirigible craft such as an aircraft is controlled in its flight path under control of a signal dependent on the direction of the craft velocity vector and orientation of the craft relative to a given object or relative to a point on the surface of the earth such as on a ground track. More particularly the invention relates to control of the craft whereby its velocity vector and also the craft actual future vertical path will pass at a desired distance from the object or point on the ground track on the surface of the earth whereby such control provides desirable terrain following capability and collision avoidance control for such craft and similar vehicles such as drones, missiles, and the like.

It is an object of this invention to provide an improved terrain following control for a dirigible craft.

It is a further object of this invention to provide an improved collision avoidance control for a dirigible craft.

A further object of the invention is to ascertain the vertical acceleration or normal acceleration required of the craft to avoid contact of the craft and point within a ground track, at a future time.

A further object of the invention is to control the craft in accordance with the computed normal acceleration.

A further object of the invention is to defer control of the craft by the computed vertical or normal acceleration until such computed acceleration attains a predetermined magnitude.

For a more complete understanding of the above and other objects of the invention, reference may be had to the accompanying drawings in which:

FIGURE 1 illustrates the geometry of the terrain following problem;

FIGURE 2 shows a terrain following aircraft flight path over typical terrain;

FIGURE 3 is a block diagram of an aircraft provided with the command limit terrain avoidance system;

FIGURE 6 is a form of divider which may be utilized in implementation of the arrangement of FIGURE 4;

FIGURE 7 is the maximizing circuit of FIGURE 4; and

FIGURE 7A is a preferred embodiment of the maximizing circuit.

Figure 4:
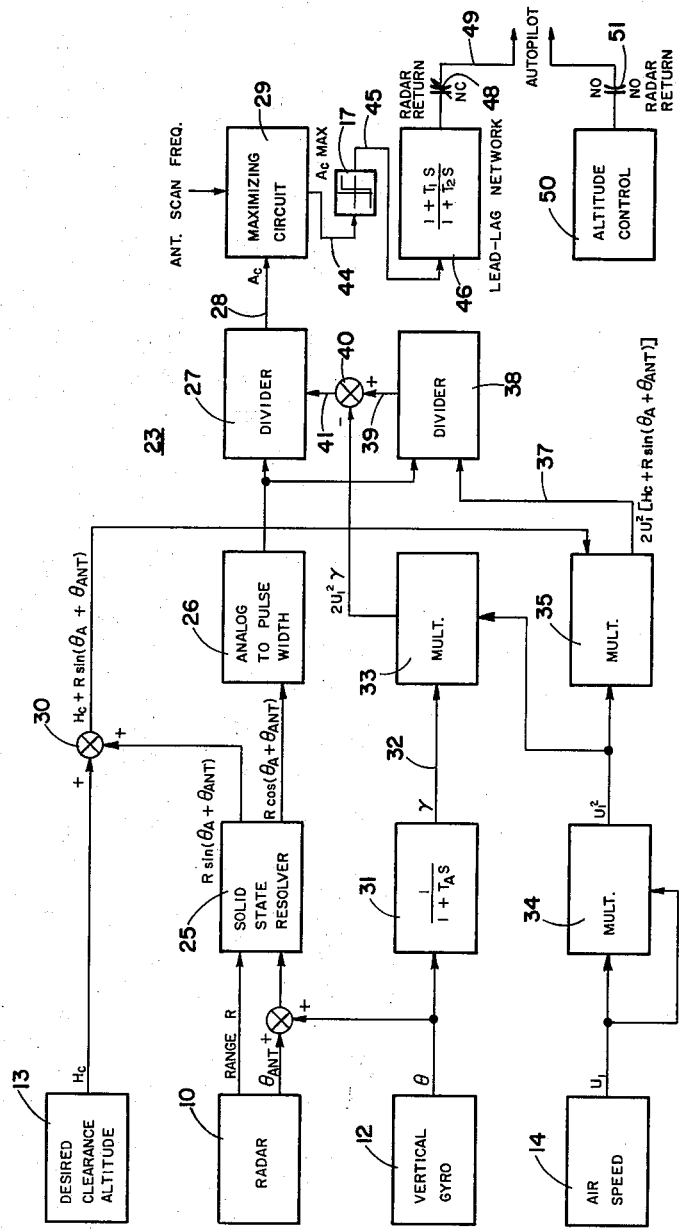
FIGURE 4 is a block diagram in greater detail of the command limit terrain following computer and automatic pilot.

The arrangement is referred to as the command limit terrain following or terrain avoidance system with the term command limit therein designating or defining that the vertical or normal acceleration which can be applied to the craft can be maximized. By so doing the contour following capability is also maximized and in addition the normal acceleration is limited to avoid structural failure or damage to the craft being controlled. The term terrain avoidance is rather self-descriptive and requires no further amplification. The concepts embodied in the apparatus are based on utilization of the maximum available radar capability, for example (that is maximum amount of radar range and scan angle information), and the maximum maneuvering capability ($g$-capability) of the vehicle. In accordance with the concepts, the present radar ranges from the craft to a series of points on the terrain such as points on the ground track, along with the relative angle information between each such point on the terrain and craft within a certain scan angle is obtained, from a scanning forward-looking sensor. For each scan cycle of the radar device, the interim normal or vertical acceleration required of the craft in order for the craft to reach each point on the terrain ground track or on the terrain clearance contour (if the terrain is to be followed at a preselected height) is calculated, and the maximum acceleration value ($a_{max}$) for each scan cycle is then selected. The maximum acceleration value is then compared to some preset acceleration ($a_1$) which can be the selected maximum craft acceleration. The difference between these two acceleration functions is fed to a control device such as a relay to provide full control of the craft in one direction or the opposite direction. Thus, an acceleration maneuver of the aircraft upwardly at the positive command limit for the craft ($N_{z_{c+}}$) is initiated whenever the calculated maximum acceleration ($a_{max}$) is slightly greater than the preset value ($a_1$); conversely, a pitch-down maneuver at the negative command limit for the craft ($N_{z_{c-}}$) is initiated whenever $a_{max}$ is less than the selected acceleration $a_1$. This will cause the vehicle to follow the terrain clearance altitude as closely as the command limits for the craft will allow during each scan cycle.

Of considerable significance is that by comparing the vertical acceleration required of the craft ($a_{max}$) with the preset acceleration ($a_1$), actual change in attitude of the aircraft is deferred until the required acceleration exceeds acceleration ($a_1$) to effect close contour following. Without such comparison with the preset acceleration ($a_1$), a commanded change in the vertical acceleration of the craft would occur as soon as the calculated acceleration ($a_{max}$) attained even small magnitudes. The terrain following would be effected at small attitude changes without the comparison, and the attitude change would occur so far in advance as to preclude close following.

Referring now to the drawings for details of the invention and initially to FIGURE 1, an aircraft at the point O in time $t=0$ and $x=0$ has its longitudinal axis in the direction O—Z. The pitch attitude of the aircraft relative to the horizontal is $\angle ZOP'$, shown distorted for line separation. The angle of attack ($a$) of the aircraft is $\angle ZOP_2$; the flight path angle $\gamma$ is $\angle ZOP' - \angle ZOP_2$. The velocity vector, $U_1$, of the craft thus has an angle $\gamma$ relative to the horizontal OP'. An angle ZOP$_1$ is obtained from radar apparatus on the craft. The quantity $h_c$ is the clearance altitude desired of the craft in following the terrain. The distance $d_p$ is the vertical distance between the uncorrected future position P$_2$ of the craft and the correct position P.

A mathematical computation of the acceleration required of the vehicle necessary to reach point P on the terrain clearance contour is derived below based on quantities shown in the arrangement in FIGURE 1. As stated, a pitch-up command will be given if the calculated acceleration is equal to or slightly greater than some preset maximum acceleration (which is less usually than the full acceleration capability of the vehicle) during any scan cycle. If the calculated normal acceleration is less than the preset positive acceleration limit, a pitch-down command is given until the desired clearance altitude is reached.

Reverting to FIGURE 1 for derivation of the direction of acceleration of the craft, assume that the vehicle flies at constant speed of $U_1$ ft./sec., and at $t=0$ it sees the point P$_1$ on the terrain with the antenna scan angle $\theta_{ant}$ radians, measured from the longitudinal principal axis of the vehicle.

Let $d_p = \overrightarrow{P_2P}$ = required change in vertical displacement of craft from uncorrected future position $h_c = \overrightarrow{P_1P}$ = set value of craft altitude clearance of terrain $\gamma$ = flight path angle of the craft in radians measured from horizontal line OP′ to the velocity vector = $\theta - \alpha$, $\theta$ = pitch attitude, $\alpha$ = angle of attack, alternatively $$\gamma = \frac{\theta}{1 + T_A S}$$

where S is the Laplace operator and $T_A$ is the aircraft time constant, and
$\theta$ = pitch angle in radians
$\theta_{ant}$ = radar scan angle in radians, measured between the vehicle longitudianl axis and a line to the point on the terrain.

Then, for the case as shown in FIGURE 1:

$$\overrightarrow{P_2P_1} = \overrightarrow{P_2P} + \overrightarrow{PP_1} \text{ vectorially}$$
$$= d_p - h_c$$

but, $$\overrightarrow{P_2P_1} = \overrightarrow{P_2P'} + \overrightarrow{P'P_1}$$
$$= -R \cos(\theta + \theta_{ant}) \tan \gamma + R \sin(\theta + \theta_{ant})$$

where R = radar range.

For small angle of $\gamma$, $\tan \gamma \approx \gamma$, then $$d_p - h_c = -\gamma R \cos(\theta + \theta_{ant}) + R \sin(\theta + \theta_{ant})$$

and $$d_p = -\gamma R \cos(\theta + \theta_{ant}) + R \sin(\theta + \theta_{ant}) + h_c$$

but
$$d_p = \tfrac{1}{2} a_p t^2$$

where $a_p$ = vertical acceleration needed to reach the point P on the perpendicular to OP′, and at the desired clearance altitude $h_c$ or $P_1P$, and $$\overrightarrow{OP_2} = \frac{R \cos(\theta + \theta_{ant})}{\cos \gamma} \approx R \cos(\theta + \theta_{ant})$$

$\gamma$ being small if $U_1$ = constant, then $$t \approx \frac{R \cos(\theta + \theta_{ant})}{U_1} = \text{time to future position}$$

Hence, $$a_p = \frac{2 d_p}{t^2} = 2 d_p \times \left[ \frac{U_1}{R \cos(\theta + \theta_{ant})} \right]^2$$

(1)
$$a_p = \left[ \frac{2 U_1^2}{R^2 \cos^2(\theta + \theta_{ant})} \right]$$
$$-\gamma R \cos(\theta + \theta_{ant}) + R \sin(\theta + \theta_{ant}) + h_c$$

For the arrangement for computing the vertical acceleration and controlling the craft, reference is made to FIGURE 3. In FIGURE 3, a radar range device 10 (which may be a Hughes Aircraft Corporation E-4, E-5, E-6, MG-2, MG-3, MG-10, MG-12, and MG-13 series) supplies the range from the craft to a particular point on terrain 11 and also the radar antenna angle $\theta_{ant}$ to the point, to the acceleration computer 23. An additional input to the computer 23 such as pitch angle $\theta$ of the aircraft is supplied from a vertical gyroscope 12. Further inputs are air speed of the craft through device 14 and terrain following clearance $h_c$ from an arrangement 15 which may be manually set in. The output from computer 23 is summed at summing arrangement 16 with a set value of vertical acceleration ($+a_1$) provided by settable means 13. The output from summing point 16 is applied to a relay or bistable device 17. The acceleration $a_1$ set in could represent either the maximum maneuvering capability of the vehicle in the case of a missile or some desired level of acceleration set by the pilot in a manned vehicle.

In accordance with the comparison of the two accelerations at summing point 16, the bistable device 17 has an output that provides either the positive maximum or negative maximum "g" command for the craft. The device 17 may be considered a bistable element or similar controller providing full output of positive or negative values. The output of the bistable device 17 is applied to a lead network 18 which may be of the solid state type comprising resistance and capacitance to shape the command signal to the vehicle 19 which in the diagram is the autopilot-aircraft combination. A control surface in the autopilot-aircraft combination is displaced, such control surface being the elevator surface for example, resulting in an acceleration $N_z$ along the craft z axis or aircraft yaw axis. This vertical or normal acceleration of the aircraft results in a change $$\frac{N_z t^2}{2}$$

in vertical position of the aircraft identified as the geometry 20 so that the aircraft undergoes displacement $\Delta h$. This quantity $\Delta h$ is combined at summing device 21 with the craft initial altitude at turn on of the terrain following apparatus which is derived from a device 22. The aircraft altitude change is reflected back to the radar apparatus 10.

FIGURE 4 shows the computer arrangement 11 along with its sources of control signals in greater detail. It will be evident from examination of the terms in Equation 1 above for the required acceleration to be applied to the craft and FIGURE 4, that the equation is mechanized in FIGURE 4 in a slightly different arrangement but the ultimate result is the same. For example, with respect to the expression in brackets in Equation 1, in FIGURE 4 the last two terms in the expression are successively divided by the square root of the denominator of the fraction which is a factor of the entire expression, whereas the first term within the expression has a factor which is common with the square root of the denominator of the factor for the expression and therefore but one division of the square root of the denominator is made instead of two divisions and the common factor is not actually provided for the first term in the bracketed expression.

Bearing in mind the above, in FIGURE 4, the slant range R and angle $\theta_{ant}$ from radar 10 are applied to a solid state resolver 25, and one output therefrom is combined at summing device 30 with the desired clearance altitude $h_c$ from device 13 to provide the last two terms in the expression within the brackets of Equation 1. An airspeed device 14 has its output $U_1$ applied to a multiplier 34 to provide the output $U_1^2$ which is combined in a second like multiplier 35 with the output from device 30 to provide the product of the two terms and the numerator in the factor for the bracketed expression in Equation 1. This product is supplied by transmission means 37 to a divider 38 more fully illustrated in FIGURE 6. This divider 38 effects a first division of the product and an output from device 26.

The vertical gyro 12 provides the aircraft pitch attitude signal firstly as an input to the solid state resolver 25 and secondly as an input to a lag device 31 whose output is flight path angle $\gamma$, it being known that lagged pitch attitude may be made equal to the flight path angle $\gamma$ by proper proportioning the lag device 31. The output from lag device 31 passes by transmitting means 32 to multiplier 33 whose output $2U_1^2 \gamma$ represents the product of the numerator of the factor for the expression in brackets in Equation 1 and flight path angle. The output from the multiplier device 33 is combined at 40 with the output from divider 38 and the difference is supplied through transmission means 41 to the divider 27 which effects a division of the difference by the factor [R cos $(\theta_a+\theta_{ant})$]. The output of divider 27 is the calculated vertical acceleration required of the aircraft.

This acceleration as used is actually the normal acceleration to be applied to the aircraft which acceleration is in the direction of the vertical axis of the craft. However, since in substantially all situations involving terrain following there is only a slight angle between the craft normal acceleration vector and the craft vertical acceleration vector the angle may be considered not material in the computation.

The acceleration called for of the craft is supplied through transmission means 28 to maximizing circuit 29 which may be of the type shown in FIGURE 7A in detail. The output from maximizing circuit 29 is supplied through transmission means 44 to relay or bistable device 17 which has full output when the acceleration called for exceeds the maximum allowable acceleration or set value $a_1$. The output from relay 17 (which if positive is equal to $N_{z_{c+}}$ which is equal to $a_1$ ideally) on transmission means 45 is the acceleration called for of the autopilot-aircraft combination. The transmission means is connected to a conventional lead-lag network and to a normally closed relay contact 48 to the autopilot of the type disclosed in Patent 2,960,284 dated November 15, 1960, forming part of the combination 19 of FIGURE 3.

When the aircraft is not in the terrain-following mode, the relay contact 48 may be opened and a second relay contact 51 may be closed whereby altitude hold control through an altitude device 50 is supplied to the autopilot of the aircraft.

The remaining figures, namely FIGURES 5, 6, 7 and 7A relate to specific forms of components of the terrain avoidance computer of FIGURE 4, but it is evident that other components for effecting the computation may be substituted for those disclosed. The invention thus does not depend on the specific components. The solid state resolver 25 of FIGURE 4 may be similar to that disclosed in the prior application of Donald J. Rotier, Serial No. 97,448, filed March 22, 1961, see FIGURE 4 thereof, for example.

The solid state resolver 25 comprises modulator sections 60, 70, a phase shifter 90, and multiplier demodulator 100. Modulator 60 comprises modulator bridges 63, 64 consisting of properly arranged asymmetrical conducting devices. A D.C. signal proportional to range is supplied from conductor 65 to each of the rectifier arrangements 63, 64. A 3.5 kc. oscillator 61 through transformer 62 supplies the alternating voltage of fixed frequency. The output from the modulator 60 appears across transformer 66 in the form of an alternating square wave (illustrated by the symbol adjacent the transformer) which through filter 67 is converted to an alternating voltage as symbolized having an amplitude proportional to range.

Modulator 70 comprises asymmetrical arrangements 71, 72 having supplied thereto an A.C. voltage from reference 1 in the form of a transformer 74 connected on the output side of a filter 73 connected across a winding of transformer 62. The D.C. input to modulator 70 consists of the sum of $\theta_{ant}$ supplied on conductor 76 which is combined with the pitch attitude $\theta_a$ on conductor 77 through the summing device 78. The output of the summing device 78 is supplied in one instance to a nominally 3.5 kilocycle oscillator 79 whose frequency varies with the magnitude of the D.C. input from summing device 78. Additionally the output of summing device 78 is supplied via conductor 75 to the modulator 70.

The phase shifter 90 comprises asymmetrical conducting devices of arrangements 91, 92 which are energized from a source 93 of alternating voltage of 3.5 kilocycles. The other input is derived through transformer 80 from the oscillator 79. The output from phase shifter 90 appears across transformer 111.

The modulator 100 comprises two sections 101, 104. Section 101 comprises asymmetrical conductive elements arranged in bridge forms 102, 103, and modulator section 104 consists of asymmetrical conducting elements similarly in bridge arrangements 105, 106. Section 101 is energized through a transformer 107 in accordance with range and also through a transformer winding 108. Section 104 is energized in accordance with the output of the phase shifter 90 through transformer 111 and through windings 112, 113 of transformer 107 also in accordance with range. The output from section 101 appears across resistor 114 as a D.C. voltage whereas the output of section 104 appears across resistor 116 as a D.C. voltage in proportion to the quantities indicated.

Figure 5:
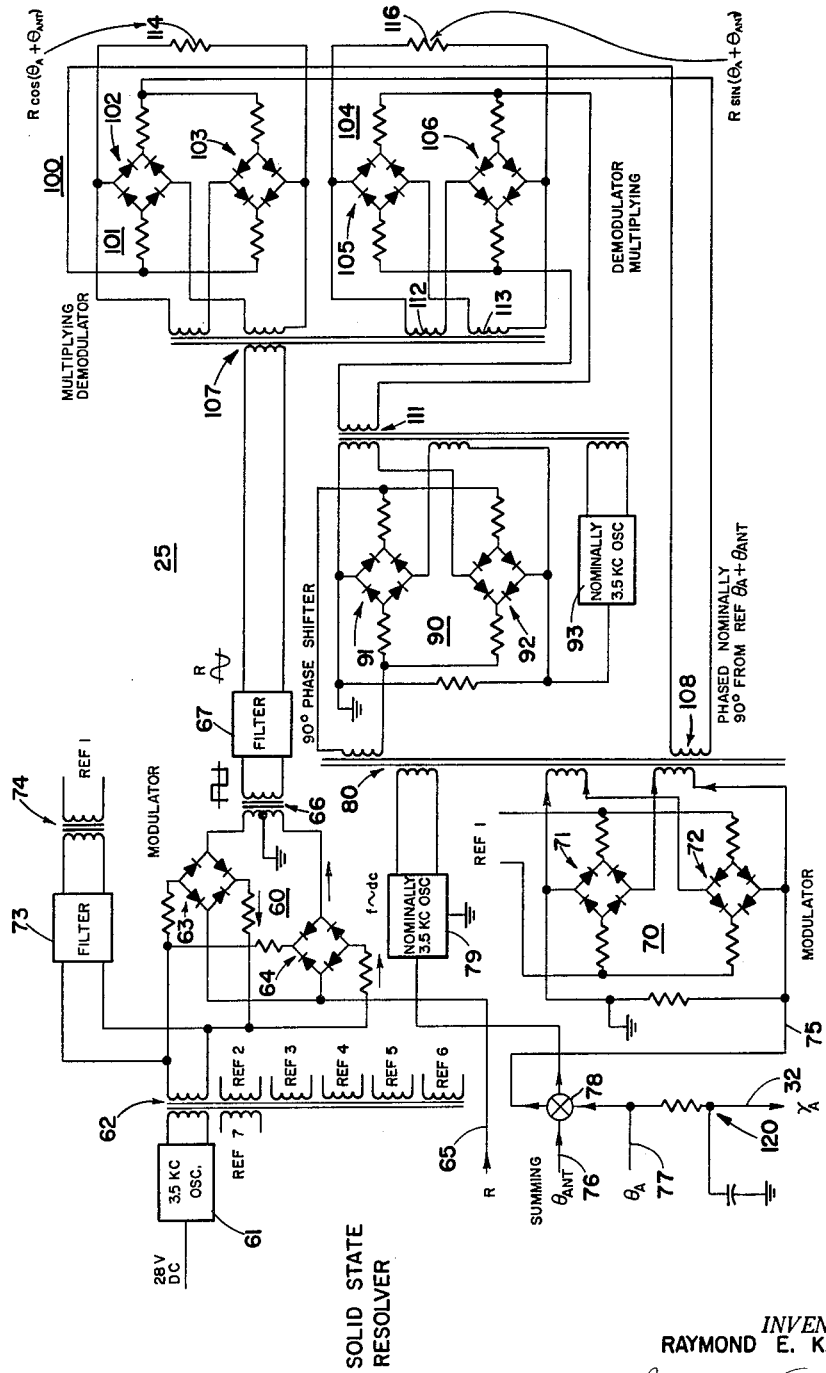
FIGURE 5 is a form of solid state resolver utilized in FIGURE 4.

It will be noted that while not forming a part of the solid state resolver, a lag network 120 also receives the pitch attitude signal from conductor 77 in FIGURE 5 to supply the flight path angle $\gamma$ over conductor 32 as in FIGURE 4.

Continuing with other elements of FIGURE 4 in addition to computer 25, the device 26 of the terrain avoidance computer may be similar to that disclosed in and utilized in the gain changer of the adaptive controller 12, FIGURE 2 in a prior application of Remus N. Bretoi, Serial No. 12,055, filed March 1, 1960.

The multiplying devices 33, 34, 35 may also be constituted of elements of the type disclosed and arranged in the aforesaid gain changer of the Bretoi application or in the solid state resolver 25 herein.

Division is effected by dividers 27, 38 of FIGURE 4 and jointly shows in schematic detail in FIGURE 6 along with the analog to pulse width device 26. The output $a_p$ or calculated vertical acceleration is transmitted by conductor 28, the other output $a'_p$ may be used for purposes not pertinent here. It is apparent that the output $a_p$ is based on Equation 1 above.

Divider 38 is in the upper part of FIGURE 6 has a summing device indicated at 120 which receives one input from multiplying device 35, FIGURE 4. Divider 38 additionally includes a high gain amplifier 121, a bridge arrangement 122 associated with amplifier 121. The arrangement of FIGURE 6 additionally includes a summing device 130 connected to analog to pulse width device 26 comprising amplifier 131, a saturable reactor 132, a second amplifier 133, a primary winding 146 of a transformer 145 having secondary windings 148, 149, 150, a feedback arrangement 134 comprising asymmetrical conducting elements, and a feedback conductor 135.

The arrangement includes an additional summing device 138 supplied through conductor 139 from multiplying device 33, FIGURE 4. Associated with summing device 138 and constituting part of divider 27 which effects the second division by $R \cos (\theta_a+\theta_{ant})$ is a further summing device 141, a high gain amplifier 142, an asymmetrical conducting arrangement 143, and secondary winding 150.

As noted, the output from amplifier 133 of device 26 energizes the primary winding 146 of transformer 145 and through secondary winding 148 effects a division of the input to summing device 120 which input as thus modified appears on the output conductor 125 of amplifier 121 which is transmitted by conductors 136, 137 to the summing device 138.

The output of amplifier 133 through primary winding 146 is also applied to secondary winding 150 which effects a further division, this division being applied to the input of high gain amplifier 142 so that the output $a_p$ appears on conductor 28 in accordance with Equation 1 above. In this consideration, the input $2U_1^2\gamma$ from device 33 has been based on the fact that the expression $(\theta+\theta_{ant})$ is small.

The maximizing circuit 29 of FIGURE 4 is shown in simplified form in FIGURE 7 and in a second form in FIGURE 7A. The maximizing circuit of FIGURE 7 comprises the switches 100, 101, 102, a capacitor 103, resistor 104, a device termed a solid-state synchronizer 107 similar to that disclosed in a prior application of Rotier et al., Serial No. 92,685, filed March 1, 1961, an asymmetrical conducting device 110, and an A.C. input conductor 108 similar to 28, FIGURE 4.

The arrangement is shown in a different embodiment in FIGURE 7A and comprises amplifiers 114, 115, 116, asymmetrical conducting devices 117, 118, 119, and an A.C. conductor 120 connected to amplifier 114. The operation is thuswise and is explained by reference to the arrangement of FIGURE 7, at the instant 122 as shown in the related diagram of FIGURE 7A associated with conductor 120 when the A.C. input voltage has gone through less than one-half of a full cycle, switch 100, FIGURE 7 closes and switches 101 and 102 are open and the voltage begins by charging condenser 103. At instant 123 during the first half of the second cycle, switch 100, opens and switch 101 closes so that the charge on condenser 103 is applied to the solid state synchronizer 107 termed sampling to provide an output on conductor 109. Prior to the instant 124 on the first half wave of the second cycle switch 102 closes discharging the condenser but switch 101 opens placing the arrangement in condition so that at point 124 similar to period 122 switch 100 may be closed while switches 101 and 102 are open. The outputs from the synchronizer 107 on conductor 109 are shown in square wave form adjacent the figure. The function of the maximizing circuit is to select the maximum acceleration for each scan cycle and pass this maximum value. The output from the maximizing circuit is supplied through a lead-lag network and through contact 48 to an automatic pilot of the craft which controls the elevator surface to alter craft attitude to maintain the desired terrain clearance.

It will now be evident that there has been provided apparatus which has excellent terrain contour-following capability for a large class of vehicles such as drones, missiles and piloted aircraft over wide speed ranges. The system uses the maximum amount of range and angle information available from the radar. The system or apparatus utilizes the maximum maneuvering capability of the vehicle and also cannot command a maneuver which exceeds the vehicle capability. The maneuvering capability of the aircraft may be selected by a pilot of a piloted aircraft. The desired clearance altitude can be selected by the pilot around some nominal value; and the system reverts to conventional altitude control upon loss of radar lock-on.

While but a single embodiment of the invention has been illustrated and described, it is to be understood that the invention may be applied in various forms. For example, changes may be made in the arrangement shown without departing from the spirit or scope of the invention and reference should be made to the appended claims for a definition of the limits of the invention.

What is claimed is:

1. Aircraft altitude control apparatus for terrain following, said aircraft having forward scanning radar means for producing a range signal dependent on the distance between the aircraft and an object ahead of said craft and the angle between a direction on the craft and the range line between the craft and object, comprising: settable means for selecting a desired future terrain clearance for the craft over the object; operable means for computing the time of flight from the craft present position to the position over the object at the desired clearance; additional means for computing the required change in altitude of the craft during the time to thus produce the desired clearance; and further means responsive to the additional means for controlling said craft.

2. In condition control apparatus for maintaining the desired relation between two conditions, one of which is varying but independent of the control apparatus; first means for producing a signal varying as the present relation between said two conditions; second means for selecting a desired relation between said two conditions; third means for computing the time from the existence of the present relation of said two conditions to the existence of a future relation of said conditions; fourth means for computing the required change in the condition during such time; and further means responsive to the third and fourth means for controlling said apparatus.

3. Altitude control apparatus for an aircraft, said aircraft having means for producing a forward range signal and the angle between a direction on the craft and an object on the line constituted by a series of objects or points for which the range is obtained in sequence, comprising: first means for computing the time of flight from the craft present position to the future position vertically over the object; second means for computing the change in altitude of the craft required during this time to obtain the desired altitudes, and further means responsive to the first and to the second means for controlling said craft.

4. An altitude control apparatus for an aircraft for terrain clearance following by said aircraft, the craft having radar means for producing a forward range signal from the craft to an object and the angle between a direction on the craft and the range line to the object, comprising: first means for selecting a desired terrain following clearance altitude over the object; second means controlled by the radar means for computing the time of flight from the craft present position to the future position over the object at the desired clearance; third means controlled by the second means for computing the vertical acceleration of the craft necessary during the time to thus produce the desired clearance; and further means responsive to the second and the third means whereby the craft may be controlled.

5. The apparatus of claim 4; position maintaining means for obtaining the angle between the horizontal and a longitudinal line on the craft and combining the same with the radar measured angle to modify the operation of the second means.

6. The apparatus of claim 5 wherein the further means controls the pitch attitude of the aircraft.

7. In apparatus whereby the altitude of an aircraft may be controlled for terrain contour following, said aircraft having means for producing a forward range signal from the craft to an object and a signal in accordance with the angle between a direction on the craft and the line constituted by a series of objects for which the ranges are sequentially obtained, comprising: means for providing a signal in accordance with a desired clearance altitude over an object; means providing a signal in accordance with the angle between the horizontal and the longitudinal direction on the craft; further means controlled by the range signal, both angle signals, a signal in accordance with the velocity of the craft, and desired terrain clearance signal computing the interim calculated vertical acceleration required of said craft between its present position and the future position over said object; and output means responsive to said vertical acceleration whereby the craft may be controlled.

8. In apparatus for controlling the directional movement of a dirigible craft, in combination: means for obtaining a signal in accordance with the slant distance of the craft relative to an object which lies in a vertical line being approached by said moving craft; means producing a signal in accordance with the velocity of the craft; means responsive to the slant distance signal and velocity of the craft signal and a signal in accordance with the angle between the range line to the object and the longitudinal axis of the craft, computing the future desired position along said vertical line of the craft relative to the object.

9. In control apparatus for a moving craft, in combination: means for obtaining a signal in accordance with the slant distance of the present position of the craft to an object which lies in a perpendicular line being approached by said moving craft; means obtaining a signal in accordance with the angle between the longitudinal axis of the craft and a line at right angles to said perpendicular line; means obtaining a signal in accordance with the angle between the longitudinal axis and the range line to said object; means obtaining a signal in accordance with the angle between the line at right angles to said perpendicular line and the flight path of the craft toward said perpendicular line; and computer means controlled by said signals for computing the distance in the direction of the perpendicular line that said craft must travel to attain a desired position therealong at the time of intersection of its path of travel with said perpendicular line.

10. In a terrain following apparatus for an aircraft for ascertaining the vertical acceleration to be applied to the craft to avoid collision with the terrain comprising: first means obtaining a signal varying with a function of craft airspeed; second means obtaining a signal varying with both a function of the object distance or slant range from the craft and the cosine of the angle between the horizontal and range line to the object; third means obtaining a signal varying with the flight path angle of the aircraft; fourth means obtaining a signal varying with both the object distance and sine of the angle between the horizontal and range line to the object on the terrain; and further means responsive to said four means for computing said acceleration.

11. In an aircraft having a forward scanning radar means for obtaining the range to an object on a ground path in advance of said craft and the angle between the longitudinal axis of the craft and the range line to the object, a pitch attitude sensing means for obtaining the angle between the craft longitudinal axis and the horizontal, and an airspeed sensing means, in combination: first means controlled by the airspeed sensing means providing a signal varying with the function of airspeed of the craft; second means controlled by the radar means obtaining a signal varying with the distance to the object and a first function of the angle between the horizontal and range line to the object; third means obtaining a signal from said vertical gyroscope varying with the flight path angle of the craft; fourth means controlled by the radar means and vertical gyroscope providing a signal varying with the object distance and a second function of the angle between the horizontal and range line to the object; and fifth means controlled by the first, second, third and fourth means providing the vertical acceleration of the aircraft necessary to place it in a desired vertical position relative to the object at a future time.

12. The apparatus of claim 7, wherein a selected vertical acceleration signal is applied to said output means to prevent operation thereof until the calculated acceleration exceeds the selected acceleration.

References Cited in the file of this patent

UNITED STATES PATENTS 2,965,894      Sweeney _____ Dec. 20, 1960